April 2, 1968 G. BATE ET AL 3,376,035

ELECTROMAGNETIC TRANSDUCER MANUFACTURE

Filed Dec. 10, 1964

INVENTORS
GEOFFREY BATE
JOHN R. MORRISON

BY Robert W. Ely
ATTORNEY

United States Patent Office 3,376,035
Patented Apr. 2, 1968

3,376,035
ELECTROMAGNETIC TRANSDUCER MANUFACTURE

Geoffrey Bate, Poughkeepsie, and John R. Morrison, Wappingers Falls, N.Y., assignors to International Business Machines Corporation, Armonk, N.Y., a corporation of New York Filed Dec. 10, 1964, Ser. No. 417,392
12 Claims. (Cl. 29—603)

ABSTRACT OF THE DISCLOSURE

A magnetic recording head is provided wherein a small electric coil is placed about a magnetic wire, which wire in turn is coated with a non-magnetic material and which is then coated with magnetic material. A gap is provided by removing the bottom portion of the heretofore described layers and wire.

This invention relates to devices for recording or reproducing signals in relation to a magnetic surface or the like and more particularly concerns a method of making such electromagnetic transducers and the resulting devices.

A typical electromagnetic transducer or magnetic head is comprised of a magnetic core having confronting pole tips separated by a gap and a winding or coil is placed around the magnetic core. The coil can be energized and then the flux at the nonmagnetic gap will record or write on a magnetic surface. For reading, the magnetic surface affects the flux in the magnetic core to generate a signal in the coil. Such a head can be also used for magnetic transfer or copying.

A common method of manufacture involves making two C-shaped halves which have two confronting pole faces with the non-magnetic gap between the pole faces. Optical polishing and placement of a non-magnetic foil or other material between the pole faces are required. It is apparent that such a method is expensive and complicated. Further, such a method does not permit fabrication of a very thin gap which is required for high recording density, low currents, and greater miniaturization. Another disadvantage of the foregoing method exists since a high volume, batch process is not possible whereby less expense and more speed result.

An object of the present invention is to provide an improved method of manufacturing magnetic beads which is less expensive and less complicated and gives very thin non-magnetic gaps whereby high recording density and low currents result.

Another object is the provision of such a method and the resulting magnetic head wherein the gap end of the head is especially small and the entire head is relatively small dimensioned and light weight whereby a high head density assembly can be made.

An additional object is the provision of an improved method of fabricating magnetic heads which utilizes batch coating techniques and thus avoids many previously-used manual and machining operations.

A further object is to provide a magnetic head which can be used for writing or drawing on magnetic surfaces without external connections for electricity.

In accordance with a preferred embodiment of the invention, a thin, short, magnetic wire is provided and a small electric coil is placed around the wire just below the top of the wire. The coil-wire unit is then coated with non-magnetic material except for the top of the wire. The resulting structure, including the top of the wire, is coated with magnetic material. To provide a non-magnetic gap, the bottom parts of coatings are removed to expose non-magnetic material between magnetic materials. The non-magnetic coating is done so that there is a thin film layer at the gap location. The generally-annular magnetic coating step preferably is controlled so that the magnetic layer is thinner at the side opposite the gap. Then, lapping at an inclined angle will raise the thinner side of the magnetic layer so that the magnetic wire will magnetically couple only with the opposite thicker side across the thin non-magnetic gap structure. A self-contained magnetic pencil can be made by providing battery container means with connections for the coil.

The realization of the above objects, along with the advantages and features of the invention, will be apparent from the following description and the accompanying drawings in which.

Figure 1:
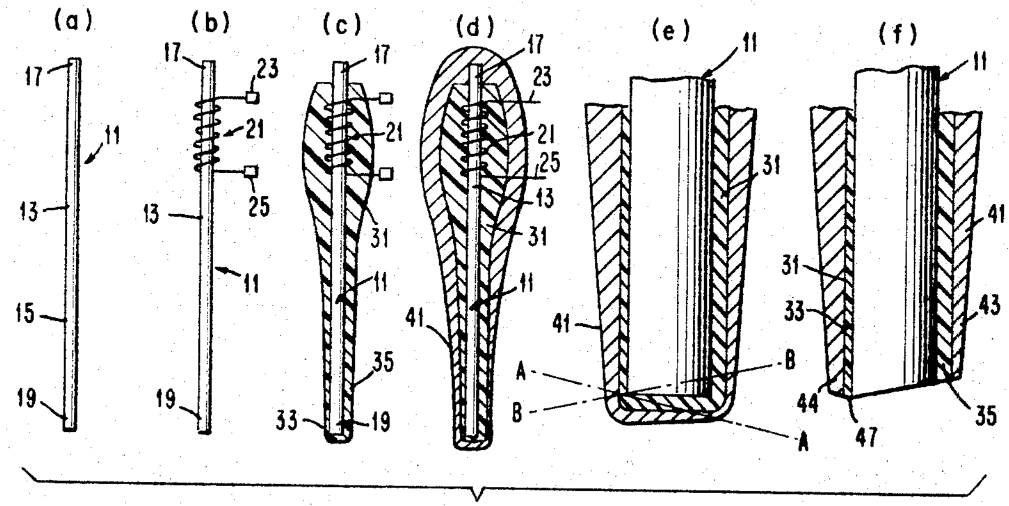
FIGURE 1 is a group of schematic views of steps of the method with later views enlarged and shows a magnetic wire, a first non-magnetic, metallic coating, a second non-magnetic coating, lapping steps on enlarged tip, and the final preferred tip.
Figure 3:
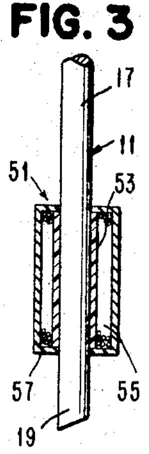
FIGURE 3 is a schematic, side, partially-cross-section view and shows a prewound coil.

Referring to FIG. 1, a high permeability, magnetic wire or similar elongated magnetic element 11 is provided. The small cross-section wire 11 has a diameter of 0.020″, a length of 1.5″, and a composition of 83% nickel and 17% iron. Other magnetic materials hereinafter mentioned can be used. The element 11 has an upper or top part 13, a bottom or lower part or half 15, a top end 17 and a bottom end 19. An electrically conductive coil 21 is next placed around the top part 13 of the wire below the top end 17. The copper coil wire is preferably prewound by a bobbin winding technique, rather than by direct winding of insulated wire, in order to provide an energizing coil. The coil 21 is shown schematically as if directly wound in FIG. 1. The bobbin construction is shown in FIG. 3 and will be subsequently described.

Figure 2:
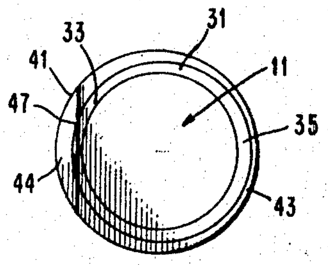
FIGURE 2 is a plane view of the bottom surfaces of the wire and two coatings.

After placing the coil 21 having leads 23 and 25 on the wire 11 at the mentioned location, a coating 31 of non-magnetic material is formed on the wire 11 and coil 21 except for the top end 17—FIG. 1(*c*). This non-magnetic coating can be plastic or metallic material. When the coating is a non-magnetic, metallic material, the plastic insulation of coil 21 is suitably treated, as by sensitizing and electrolessly depositing a very thin layer or fill of copper (not shown). Plastics, such as Mylar, are conventional treated so that non-magnetic copper or other non-magnetic metals can be electroplated thereon, when in the manufacturing process copper is being plated directly on the nickel-iron wire 11. The treatment of the plastic insulation will be described in detail in relation to FIG. 4. The metallic layer 31 is coated by conventional electroplating techniques which involve a copper anode, a plating solution in a tank, and circuitry to make the wire 11 the cathode. The non-magnetic coating 31 has an inverted tear-drop configuration and thus a tapered form or gradually-decreasing thickness from the coil to the tip results. The radial thickness is much thinner at the gap or bottom end 19 of the wire as compared to the coil or top part 13 of the wire. The thickness of the non-magnetic layer at the location of the eventual gap is 20–500 microinches. This tapering feature is achieved by inverting the coil-wire unit and gradually lowering the unit into the plating tank. Alternatively, the anode-cathode spacing is adjusted lengthwise to produce a tapered layer. Further, the anode configuration preferably is selected so that the non-magnetic sheath or coating 31 is thinner at one side 33 of the wire bottom end 19 than on the other side 35. The coating 31 thus circumferentially decreases in thickness (note FIG. 2). This feature contributes, as will appear, to the making of the effectively narrow read-write gap in the final step.

As above described, and when the non-magnetic coating is to be metallic, the wire 11 is preferably electroplated with copper by the well-known techniques. However, other processes such as chemical (electroless) deposition, evaporative deposition or sputtering can be used and controlled to give the same result. Other metals which can be used for the non-magnetic coating are silver, platinum, pallidium, or gold.

The next step, after coating with a non-magnetic metallic material, is the coating of the outer, magnetic material as the layer 41, which also is given an inverted-tear-drop profile—FIG. 1(*d*). The outer coating 41 at the tip or lower end 19 has its thinner dimensioned side 43 opposite the thinner dimension of the non-magnetic inner coating 31. The thicker side 44 is adjacent the thin section 33 of the gap material. The outer layer 41 coats directly on the previously exposed top end 17 of the nickel-iron wire 11 to provide a suitable flux path. The coating 41 preferably is the same nickel iron composition as wire 11 and is electroplated by techniques similar to the techniques above discussed for copper. Other techniques can be used for depositing the outer magnetic layer 41 of nickel iron, such as electroless deposition. Other magnetic materials can be used, such as iron having a purity of 99.9%, iron having 10% cobalt and 2% vanadium, or other "soft" or low-coercive magnetic materials. Suitable coating techniques for these materials will be obvious to those skilled in the art. For example, dipping or molding could be used with sintered ferrites. Rigidity and a continuous flux path at the wire tip 17 are obvious requirements.

Finally, as suggested by FIG. 1(*e*), the tip of the read-write blank is lapped or ground in two steps, as suggested by the two, inclined-to-the horizontal, dashed lines A—A and B—B to produce a single clean gap which is formed by the thinner, non-magnetic material at the left side of the wire. The A—A first lap or removal is in a plane inclined to the axis of the wire 11 downwardly left-to-right while the B—B second loop is in a right-to-left, downwardly-inclined plane with the planes intersecting within the cross-section of the thin side 33 of the non-magnetic gap coating 31.

With reference to FIGS. 1(*f*) and 2, it is apparent that an effective thin gap 47 at part of one side results since the thin part 43 of the outer layer 41 and thick side 35 of the gap coating are above the plane of the thin part of the inner coating 31 which forms the gap. The effective gap thickness is 5 to 1000 microinches. The flux path at the right is thus inoperative because of the difference in inclined levels and the available thick and thin cross-sections at the right side. The relatively thick cross-section of the outer layer at the left, the wire-cross-section and the very thin gap therebetween give a small diameter read-write tip which permits miniaturization and low currents. A small head tip is provided having a diameter of about 10 mils and thus is adapted to high density packaging. The small read-write part is responsive to, or effective on, very small magnetic storage areas. The height is about 1½" and the largest diameter about ¼". The wire can be 5–20 mils with proportional changes in other dimensions.

Referring to FIG. 3, the prewound coil 51 is made by winding on a .34" O.D. sleeve 53 of Teflon four hundred turns (three layers) of insulated copper wire 55 (41 gauge-3 mils) including plastic insulation (Foram). The coil 51 (0.5" length) was taped with 0.003" thick Mylar tape 57. The coil 51 easily fits on the wire 11 and the tip 17 projects upwardly from the coil.

Figure 4:
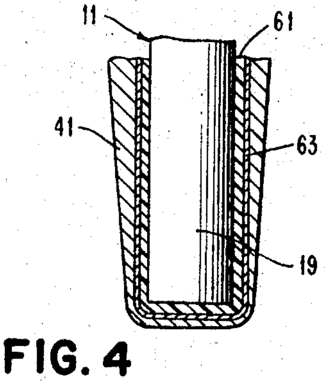
FIGURE 4 is a side, cross-sectional view of the tip part and shows a plastic non-magnetic coating with an over-thick sensitizing film on which is received a metallic magnetic coating.

In FIG. 4, an alternative method of fabricating the magnetic head is suggested. In this embodiment, the wire 11 and coil 51 except for the top end (as before) is coated with non-magnetic, plastic material 61, such as epoxy resin. Such a coating with the inverted, tear-drop profile is achieved by repeated dipping, spraying or dry molding. If sprayed or dipped, the plastic material preferably is epoxy resin. If molded via silicon rubber molds, the preferred encapsulating material is epoxy resin. This plastic coating or sheath 61 is conventionally sensitized treated to give it a copper film 63 (greatly enlarged for clarity) in order to permit deposition of the metallic, magnetic material (as above described) to form the outer coating 41. With the mentioned non-magnetic, plastic coatings and insulating covering for the wire or coil, copper is e'ectrolessly deposited, after sensitizing, using the conventional processes or the processes disclosed in U.S. Patents 3,099,608 or 2,996,408. Other known processes for treating a plastic to give it a copper or nickel film so that it is suitable for electroplating with nickel-iron and the like can be used.

As when copper or silver forms the nonmagnetic gap coating, the copper-coated plastic is preferably coated with nickel-iron by the conventional electrolytic process. When the iron-nickel alloys for the outer coating are to be deposited on a copper coating or a copper-treated, plastic coating, the nickel iron eelctrodepositive method disclosed in U.S. Patent 3,047,475 (July 31, 1962) or on page 63 of the IBM Technical Disclosure Bulletin, volume 3 No. 2 (July 1960) is used. Electroless nickel-iron deposition can be done in accordance with U.S. patent applications Ser. Nos. 162,897 and 162,894 (both filed Dec. 28, 1961 and assigned to IBM). Electroless copper deposition obviously can provide the entire outer coating 41. However, by electrolytically plating over a very thin layer (3–5 microinches) of electroless copper appreciable economy results. The total minimum thickness of copper is 50 microinches. The lower end is then lapped in planes A—A and B—B, as above described.

Figure 5:
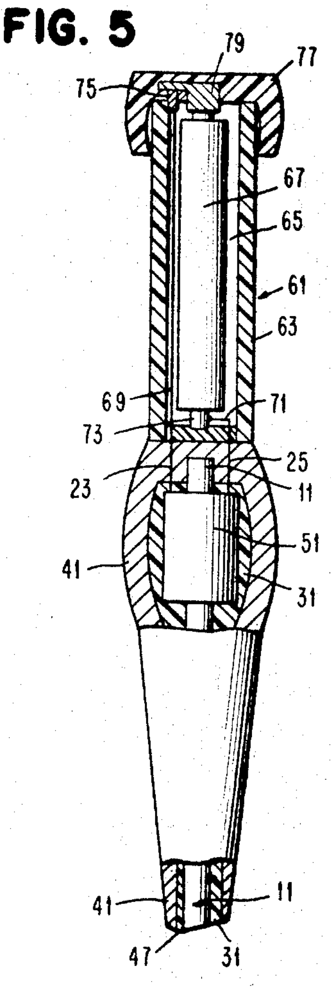
FIGURE 5 is a partially-cross-sectioned side view of the battery-powered, magnetic pencil.

In FIG. 5, the energy-self-contained pencil embodiment of the FIG. 1 type of read-write head is shown. It is comprised of (1) the ferro-magnetic wire 11, (2) the non-magnetic, metallic, inner coating 31, (3) the metallic magnetic outer coating 41 and (4) the electric coil 51. A battery container 61 is suitably mounted on the top of the head as by plastic bonding or a thread connection. Container 61 has a plastic body 63 having a recess 65; in which a dry battery 67 is mounted. The coil leads 23 and 25 are soldered to lead wires 69 and 71 which connected to battery contact 73 at the top of the body and connector 75 at the bottom of the body. A resilient plastic cap 77 snaps on the body and has a battery contact 79 which contacts connector 75 to provide a circuit. This magnetic pencil is particularly useful with the type of memory device described in U.S. patent application Ser. No. 291,521, now Patent No. 3,337,856 (June 28, 1963) also assigned to IBM. This application also discloses an alternate, four plane method of tip removal which can be used to give a comparable small accurate gap.

It is apparent that, with either a metallic or plastic gap coating, a batch-type method of manufacturing is provided since many single heads or multiple heads (using uniform thicknesses) can be made inexpensively at the same time with uniform control and without manual or complicated machine operations. This invention also gives very thin gaps able to use low currents and small-diameter head tips for high density packaging.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of making an electromagnetic transducer comprised of:

providing a thin elongated element of magnetic material having a top part and lower part which respectively have a top end and a bottom end, placing an electrically conductive coil around the top part of said element below the top end thereof,
coating said element with a non-magnetic material except for said top end thereof to form a sheathed element having an exposed top end,
coating said sheathed element with a magnetic material,
removing said magnetic material and said non-magnetic material at said lower end of said element so that said non-magnetic coating and said lower end are exposed to provide a non-magnetic gap between adjacent portions of said magnetic element and said coating of magnetic material.

2. The method according to claim 1 and being further characterized by:
said gap of non-magnetic material having thickness of 5 to 1000 microinches.

3. The method according to claim 1 and being further characterized by:
said coating of non-magnetic material having a circumferentially decreasing thickness.

4. The method according to claim 1 and being further characterized by:
said coated non-magnetic material being selected from the group consisting of copper and silver.

5. The method according to claim 1 and being further characterized by:
said coated non-magnetic material being plastic,
and said plastic material being thinly coated electrolessly with copper or nickel before said second step of coating.

6. The method according to claim 1 and being further characterized by:
said coated non-magnetic material being epoxy resin, and said resin being coated electrolessly with copper or nickel before said second step of coating.

7. The method according to claim 1 and being further characterized by:
said coating steps being done so that each coating is film-thin at opposite sides of said lower end of said element.

8. The method according to claim 1 and being further characterized by:
said coating steps being done so that said non-magnetic coating is film-thin at one side of said lower end of said element, and
said first coating step being done so that the coating of non-magnetic material has a thickness of 5 to 1000 microinches.

9. The method according to claim 4 and being further characterized by:
said second coating step including electroplating a magnetic material thereon.

10. The method according to claim 4 and being further characterized by:
said second coating step including depositing a metallic magnetic material on said first coating.

11. The method according to claim 1 and being further characterized by:
said two steps of coating being done so that both coatings decrease in thickness below said coil to give a tear-drop configuration.

12. The method according to claim 1 and being further characterized by:
said element being a very small diameter iron-nickel wire,
said second step of coating of magnetic material being done so that one arcuate section of the magnetic coating is significantly thicker than the opposite arcuate section.

References Cited

UNITED STATES PATENTS 3,222,754 12/1965 Homan ______________ 29—603

JOHN F. CAMPBELL, *Primary Examiner.*

C. E. HALL, *Assistant Examiner.*